United States Patent
Wasileski et al.

(10) Patent No.: US 9,186,762 B2
(45) Date of Patent: Nov. 17, 2015

(54) TURBINE EXTENSION NUT SUPPORT TOOL

(71) Applicants: Robert F. Wasileski, Allison Park, PA (US); Ira J. Campbell, New Richmond, OH (US); Charles C. Moore, Hibbs, PA (US); Brian W. Smith, Bay City, TX (US); Johnny Dickson, McKinney, TX (US)

(72) Inventors: Robert F. Wasileski, Allison Park, PA (US); Ira J. Campbell, New Richmond, OH (US); Charles C. Moore, Hibbs, PA (US); Brian W. Smith, Bay City, TX (US); Johnny Dickson, McKinney, TX (US)

(73) Assignee: Siemens Aktiegesellschaft, München (DE)

( * ) Notice: Subject to any disclaimer, the term of this patent is extended or adjusted under 35 U.S.C. 154(b) by 417 days.

(21) Appl. No.: 13/691,880

(22) Filed: Dec. 3, 2012

(65) Prior Publication Data
US 2013/0283583 A1  Oct. 31, 2013

Related U.S. Application Data

(60) Provisional application No. 61/639,299, filed on Apr. 27, 2012.

(51) Int. Cl.
| | |
|---|---|
| *B23P 19/10* | (2006.01) |
| *F01D 25/28* | (2006.01) |
| *B25B 5/10* | (2006.01) |
| *F01D 25/24* | (2006.01) |

(52) U.S. Cl.
CPC .......... *B23P 19/10* (2013.01); *F01D 25/28* (2013.01); *B25B 5/102* (2013.01); *F01D 25/243* (2013.01); *F05D 2220/31* (2013.01); *Y10T 29/53852* (2015.01); *Y10T 29/53978* (2015.01)

(58) Field of Classification Search
CPC .......... B23P 19/10; B23P 19/00; B23P 19/04; B25B 27/0035; B25B 5/163; B25B 5/102; B25B 1/02; B25B 1/103

USPC ............... 29/257, 281.5, 271, 239; 269/6
See application file for complete search history.

(56) References Cited

U.S. PATENT DOCUMENTS

| | | | | |
|---|---|---|---|---|
| 1,272,259 | A * | 7/1918 | Herold | ............... 269/140 |
| 5,127,797 | A | 7/1992 | Carman | |
| 5,476,300 | A | 12/1995 | Dodge | |
| 5,511,941 | A | 4/1996 | Brandon | |
| 5,898,985 | A * | 5/1999 | Villarreal | ............... 29/257 |
| 6,322,046 | B1 * | 11/2001 | Yurick | ............... 249/219.1 |
| 7,037,065 | B2 | 5/2006 | Reigl | |
| 8,146,466 | B1 * | 4/2012 | Slack | ............... 82/142 |
| 2009/0081030 | A1 | 3/2009 | Sullivan et al. | |

FOREIGN PATENT DOCUMENTS

| | | |
|---|---|---|
| CN | 2486765 Y | 4/2002 |
| CN | 101566078 | 10/2009 |
| DE | 19814291 A1 | 10/1999 |

(Continued)

*Primary Examiner* — Monica Carter
*Assistant Examiner* — Seahee Yoon

(57) ABSTRACT

A nut support tool for assembly and disassembly of a nut on a vertically extending bolt assembly located on a casing. The bolt assembly including a lower nut engaged on a lower end of a threaded shaft. The nut support tool includes a vertical span assembly having an upper support member located at an upper end thereof for engagement on an upper end of the bolt assembly, whereby the nut support tool is supported from the bolt assembly upper end with the vertical span structure extending parallel to the bolt assembly. An arm assembly extends from a lower end of the vertical span assembly and includes a lower guide pin for engagement with an access opening formed in a lower surface of the lower nut. The arm assembly is configured to support the lower nut, and to swivel relative to the casing.

20 Claims, 5 Drawing Sheets

(56) References Cited

FOREIGN PATENT DOCUMENTS

| | | |
|---|---|---|
| DE | 69906825 T2 | 4/2004 |
| EP | 1052377 A2 | 11/2000 |
| FR | 2921411 A1 | 3/2009 |
| GB | 2306155 A | 4/1997 |
| WO | 03078799 A1 | 9/2003 |

* cited by examiner

TURBINE EXTENSION NUT SUPPORT TOOL

CROSS-REFERENCE TO RELATED APPLICATIONS

This application claims the benefit of U.S. Provisional Application No. 61/639,299, filed Apr. 27, 2012, which is incorporated herein by reference.

FIELD OF THE INVENTION

The present invention relates generally to a tool for a component of a turbine, such as a steam turbine and, more particularly, a fixture or tool providing a support structure for a component in detached association with a turbine.

BACKGROUND OF THE INVENTION

High pressure steam turbines are typically constructed of top and bottom halves that are joined at a horizontal flange joint. In order to securely maintain the seal at the flange joint, large diameter bolt assemblies are provided at axially spaced locations along the flange joint. Such bolt assemblies comprise heavy components, including a heavy lower nut that is removed from a threaded shaft of the bolt assembly to permit separation of the top half from the bottom half or, alternatively, that is installed onto the lower end of the threaded shaft of the bolt assembly during assembly of the casing halves.

The lower nuts for the bolt assemblies may weigh in the range of 15 to 90 pounds, such that a heavy lower nut typically requires an overhead crane to facilitate removal and installation. Hence, the removal/installation of the bolt assemblies, such as for turbine maintenance, requires scheduling of valuable crane resources within the turbine facility, and may increase the downtime of the turbine in the event that a crane is not readily available.

SUMMARY OF THE INVENTION

In accordance with one aspect of the invention, a nut support tool is provided for assembly and disassembly of a nut on a vertically extending bolt assembly located on a casing. The bolt assembly includes a bolt assembly upper end on an upper end of a threaded shaft and a lower nut engaged on a lower end of the threaded shaft, wherein the lower nut includes an access opening. The nut support tool comprises a vertical span assembly including a vertical structure defining a longitudinal span axis extending generally parallel to the threaded shaft of the bolt assembly. An upper support structure extends from an upper end of the vertical structure generally perpendicular to the longitudinal span axis and includes an upper support member for engagement on the bolt assembly upper end whereby the nut support tool is supported from the bolt assembly upper end. An arm assembly extends from a lower end of the vertical structure and includes a lower guide pin extending generally parallel to the longitudinal span axis for engagement with the access opening of the lower nut.

In accordance with another aspect of the invention, a nut support tool is configured for use in combination with a vertically extending bolt assembly and is located for assembly and disassembly of a nut on the bolt assembly. The bolt assembly includes an upper nut engaged on an upper end of a threaded shaft and a lower nut engaged on a lower end of the threaded shaft, and each of the upper and lower nuts have an access opening. The nut support tool comprises a vertical span assembly including a vertical structure defining a longitudinal span axis extending generally parallel to the threaded shaft of the bolt assembly, and the vertical span assembly includes telescoping outer and inner tubes. The vertical span assembly additionally includes an upper support structure extending from an upper end of the vertical structure generally perpendicular to the longitudinal span axis and includes an upper support pin extending generally parallel to the longitudinal span axis for engagement in the access opening in the upper nut whereby the nut support tool is supported from the upper nut. An arm assembly extends from a lower end of the vertical structure generally perpendicular to the longitudinal span axis and includes a lower support for engagement with the lower nut. A stabilizer assembly is located along the vertical structure between the upper support structure and the arm assembly. The stabilizer assembly extends generally perpendicular to the longitudinal span axis and includes an engagement foot assembly for engaging a portion of a structure that supports the bolt assembly.

In accordance with a further aspect of the invention, a nut support tool is provided for assembly and disassembly of a nut on a vertically extending bolt assembly for a horizontal turbine flange joint of a turbine casing. The bolt assembly includes an upper nut engaged on an upper end of a threaded shaft above the flange joint and a lower nut engaged on a lower end of the threaded shaft below the flange joint, and each of the upper and lower nuts include an access opening. The nut support tool comprises a vertical span assembly, and the vertical span assembly comprises an outer tube weldment including an elongated outer tube having an upper end and a lower end, and an upper support structure extending from the upper end of the outer tube perpendicular to a longitudinal span axis of the vertical span assembly. The vertical span assembly additionally includes an upper support pin extending through the upper support structure and extending beyond a lower side of the upper support structure for engagement with the access opening in the upper nut. The vertical span assembly further includes an inner tube weldment including an elongated inner tube having an upper end and a lower end, the upper end of the inner tube extending into and being adjustable along the outer tube, and including a lower flange extending radially outwardly at the lower end of the inner tube. The nut support tool also includes a swivel arm assembly comprising a swivel tube surrounding the lower end of the inner tube and resting on the lower flange, a swivel arm including a proximal end attached to the swivel tube and including a distal end spaced from the swivel tube in a direction perpendicular to the longitudinal span axis, and a lower guide pin extending through the distal end of the swivel arm and extending beyond an upper side of the swivel arm for engagement with the access opening of the lower nut. The nut support tool further includes a stabilizer assembly comprising a stabilizer tube positioned over the inner tube at a location above the swivel arm assembly, and a coupler structure affixed to the stabilizer tube, the coupler structure extending to opposing lateral sides of the stabilizer tube. The stabilizer assembly additionally includes a stabilizer arm supported to each of the lateral sides of the coupler structure, each stabilizer arm including a proximal end located at the coupler structure and an opposing distal end, and an engagement foot structure attached to the distal end of each stabilizer arm for engagement with laterally spaced locations on the turbine casing.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
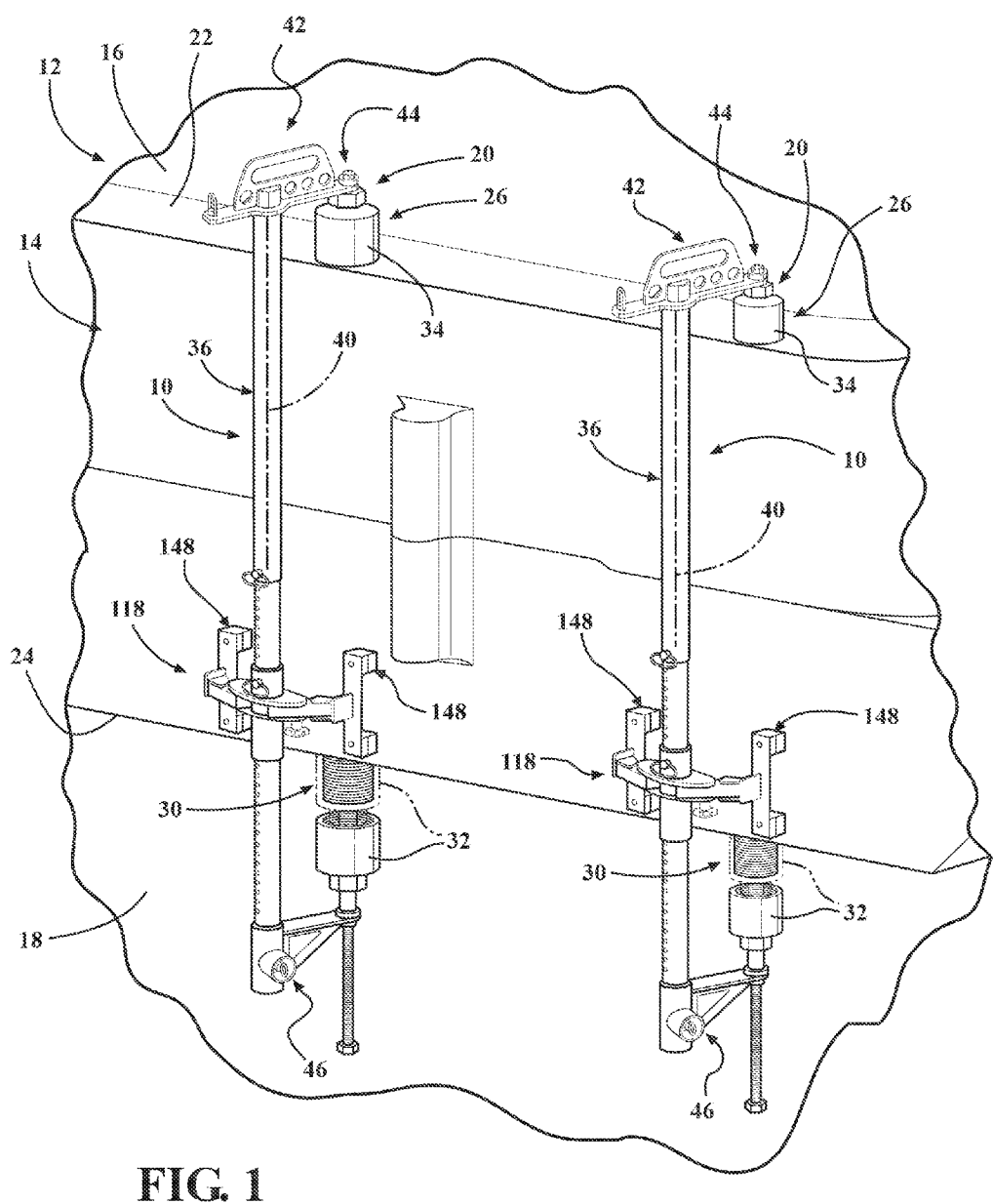
FIG. 1 is a perspective view illustrating a nut support tool in accordance with an aspect of the invention in use in association with a side of a turbine casing.

Referring initially to FIG. 1, a nut support tool 10 is shown in association with the side of a casing 12 which, in the present illustrated example, comprises a high pressure steam turbine casing having a horizontal flange 14 defining a joint between an upper casing cover 16 to a lower casing base 18. The casing cover 16 and casing base 18 are joined together at the horizontal flange 14 by a plurality of bolt assemblies 20 that extend from an upper surface 22 of the flange 14 to a lower surface 24 of the flange 14. As is further illustrated in FIG. 3, the bolt assembly 20 comprises a bolt assembly upper end 26 located at an upper end of a threaded shaft 28, and a bolt assembly lower end 30 located at a lower end of the threaded shaft 28, wherein the bolt assembly lower end 30 includes a lower nut 32 theadably engaged on the lower end of the threaded shaft 28. In addition, the bolt assembly upper end 26 may also include an upper nut 34 threadably engaged on the upper end of the threaded shaft 28. The lower and upper nuts 32, 34 typically may comprise conventional extension nuts.

Figure 2:
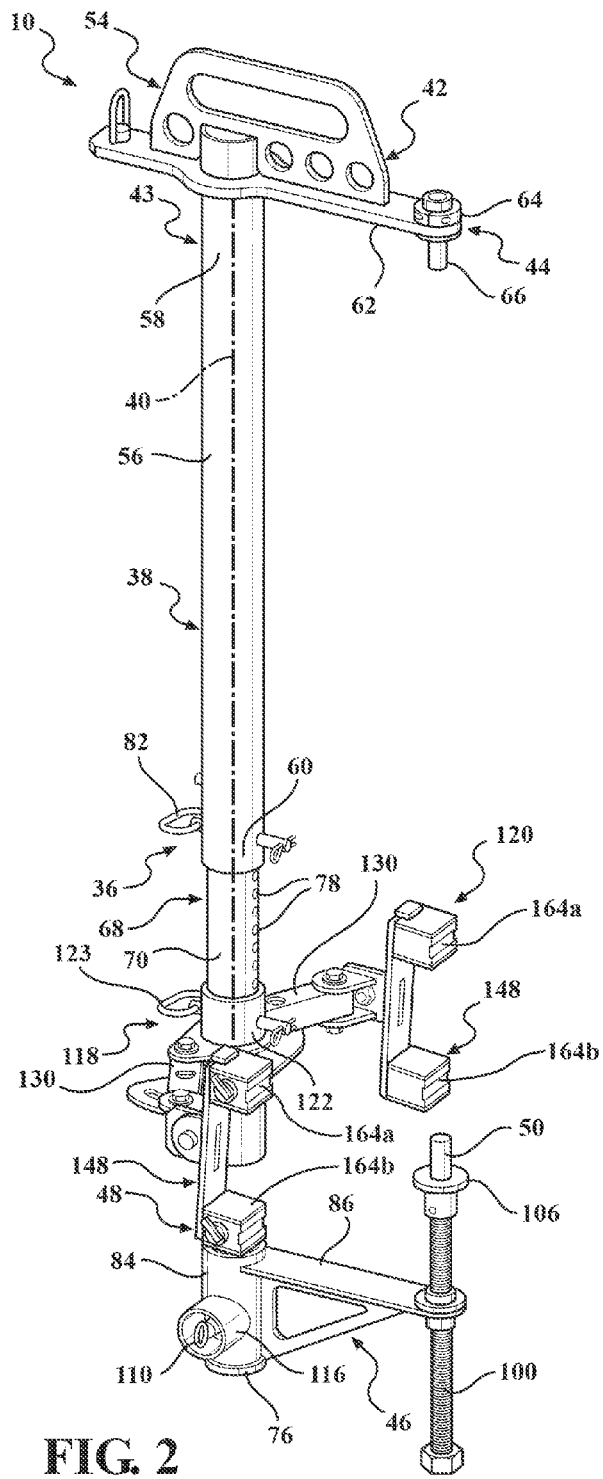
FIG. 2 is an enlarged perspective view of the nut support tool.

Referring to FIGS. 1 and 2, in accordance with an aspect of the invention, the nut support tool 10 comprises a vertical span assembly 36 including a vertical structure 38 defining a longitudinal span axis 40 extending generally parallel to the threaded shaft 28 of the bolt assembly 20. The vertical span assembly 36 also includes an upper support structure 42 extending from an upper end 43 of the vertical structure 38 generally perpendicular to the longitudinal span axis 40 and including an upper support member 44 for engagement on the bolt assembly upper end 26 whereby the nut support tool 10 is supported from the bolt assembly upper end 26.

The nut support tool 10 additionally includes a swivel arm assembly 46 extending from a lower end 48 of the vertical structure 38 and including a lower guide pin 50 extending generally parallel to the longitudinal span axis 40 for engagement with an access opening 52 (FIG. 3) of the lower nut 32. The nut support tool 10 is configured to be positioned with the upper support structure 42 located engaged on the bolt assembly upper end 26, and with the lower guide pin 50 vertically aligned with the access opening 52 of the lower nut 32, such as with the lower guide pin 50 located at least partially within the access opening 52. This positioning of the nut support tool 10 provides a support for the lower nut 32 to either be removed from or installed on the threaded shaft 28. In general, the weight of the nut support tool 10, including any weight supported by the nut support tool 10, is supported to the bolt assembly 20 through engagement of the upper support structure 42 on the bolt assembly upper end 26. As is described in greater detail below, the lower guide pin 50 is vertically movable relative to the bolt assembly upper end 26. Further, in a preferred embodiment, the swivel arm assembly 46 is movable in a lateral direction transverse to the longitudinal span axis 40 to move the lower guide pin 50 away from the casing 12.

Figure 3:
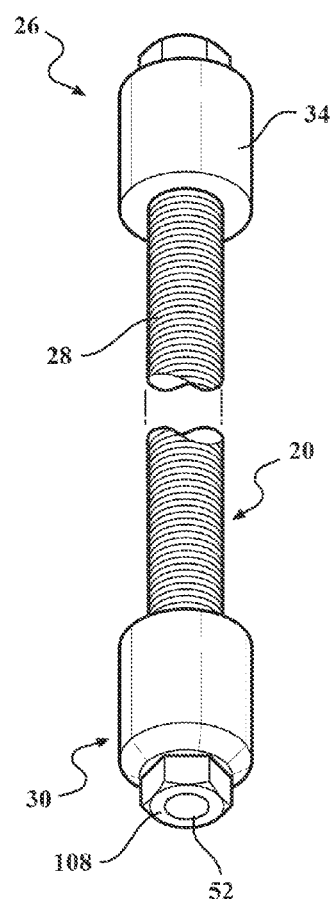
FIG. 3 is a bottom perspective view illustrating a bolt assembly and showing an access opening.
Figure 4:
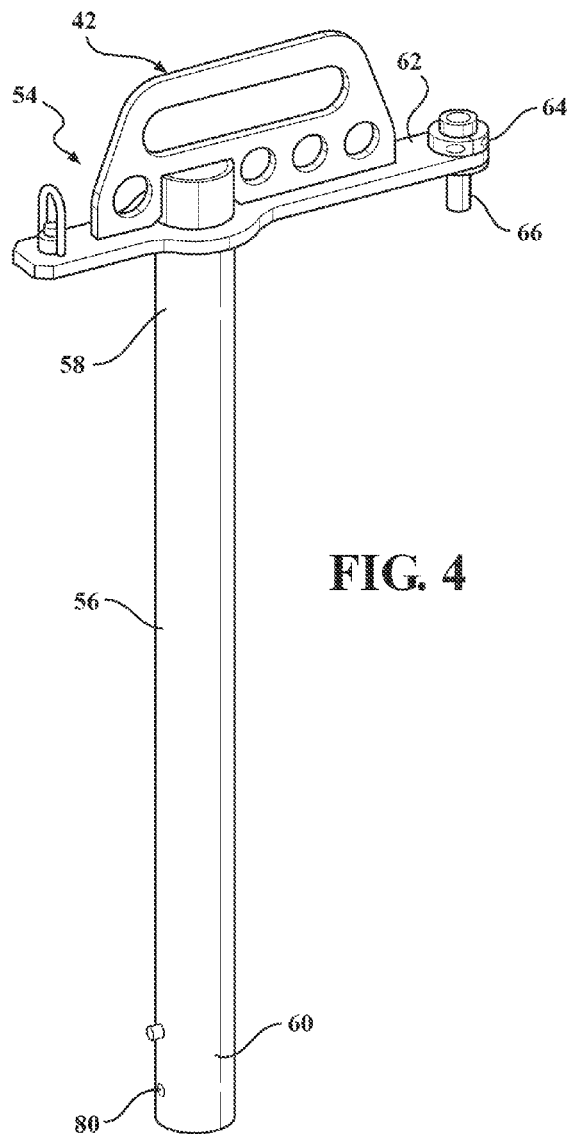
FIG. 4 is a perspective view of an outer tube weldment.

In accordance with further detailed aspects of the invention, the vertical span assembly 36 includes an outer tube weldment 54 (FIG. 4) including an elongated outer tube 56 having an upper end 58 and a lower end 60. The upper support structure 42 extends from the upper end 58 of the outer tube 56, and may comprise a horizontal plate-like member 62 extending perpendicular to the longitudinal span axis 40. The upper support member 44 is located at one end of the plate-like member 62 and may comprise an upper collar 64 rigidly affixed thereto, and a replaceable upper support pin 66 releasably clamped, or otherwise releasably engaged, with the upper collar 64 and extending beyond a lower side of the plate-like member. The upper support pin 66 is configured or sized to slidably fit within an access opening in the upper nut 34 (FIG. 3). It may be understood that the upper nut 34 may be provided with a configuration that is the same as the lower nut 32, including an access opening 52. Such access openings 52 may be provided, for example, to permit access to a hollow interior of the threaded shaft 28 for insertion of a heating element during a tightening procedure for the bolt assembly 20.

Figure 5:
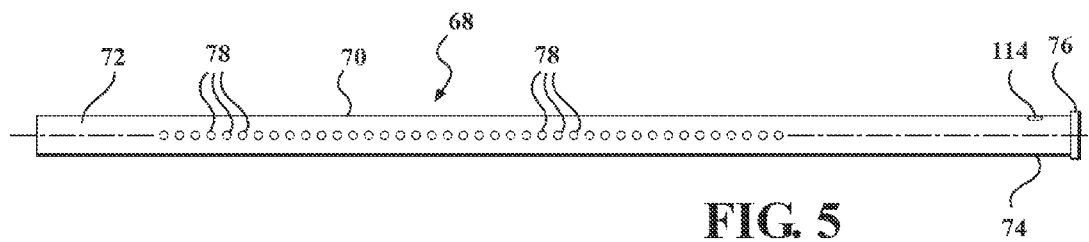
FIG. 5 is a side view of an inner tube weldment.

As seen in FIGS. 2 and 5, the vertical span assembly 36 further includes an inner tube weldment 68 including an elongated inner tube 70 having an upper end 72, a lower end 74, and a lower flange 76 extending radially outwardly at the lower end 74 of the inner tube 70. The inner tube 70 additionally includes a plurality of adjustment holes 78 extending through the diameter of the inner tube 70, and spaced longitudinally along a portion of the length of the inner tube 70. The upper end 72 of the inner tube 70 extends into and is adjustable along the outer tube 56. In particular, one of the plurality of adjustment holes 78 may be aligned with a locating hole 80 (FIG. 4) in the outer tube 56, and the relative position of the outer and inner tubes 56, 70 may be fixed with a pin 82 extending through the aligned holes 78, 80 to adjust the length of the vertical span assembly 36.

Figure 6:
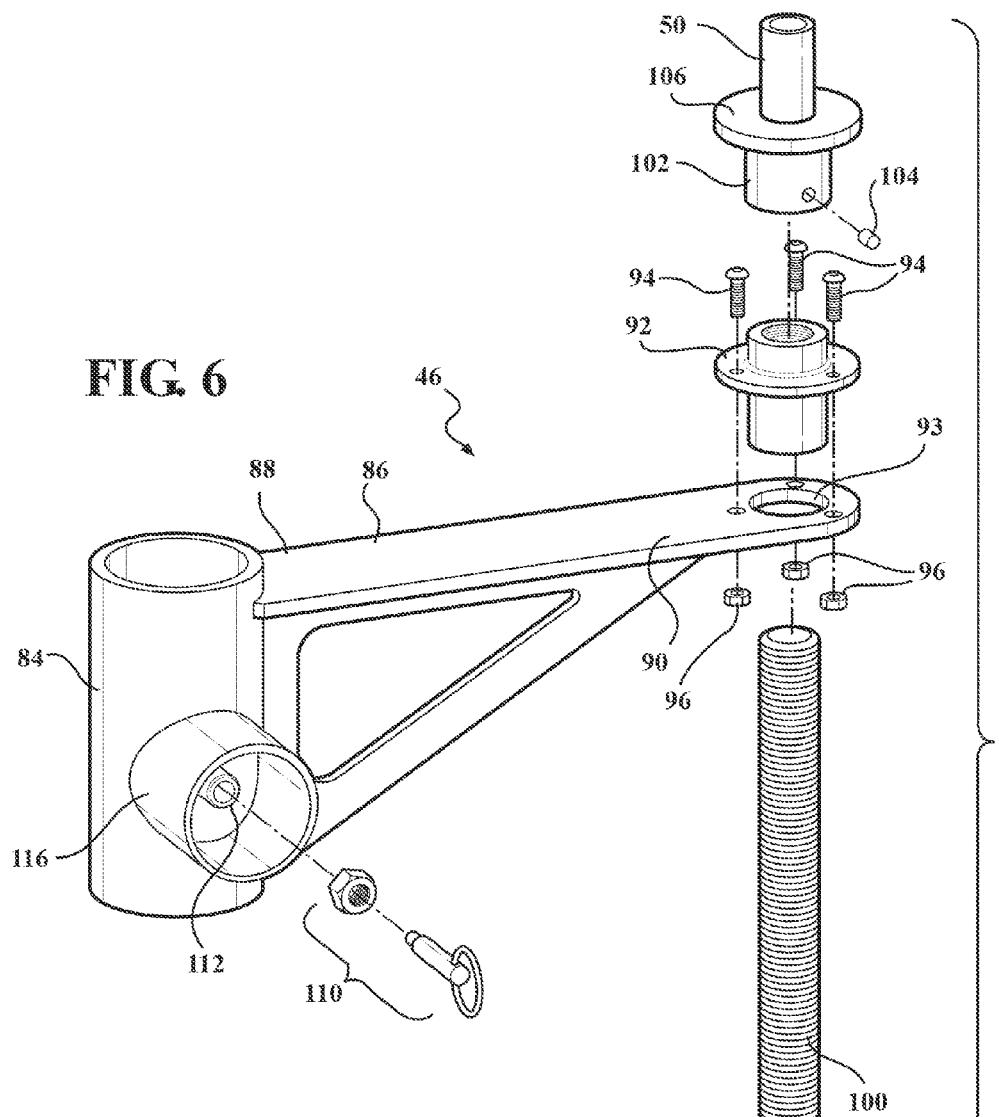
FIG. 6 is an exploded view of a lower arm assembly.

Referring to FIGS. 2 and 6, the swivel arm assembly 46 includes a swivel tube 84 surrounding the lower end 74 of the inner tube 70 and resting on the lower flange 76. The swivel arm assembly 46 additionally includes a swivel arm 86 comprising a generally horizontal plate-like member and including a proximal end 88 attached to the swivel tube 84 and a distal end 90 spaced from the swivel tube 84 in a direction perpendicular to the longitudinal span axis 40. A lower collar 92 extends through a hole 93 and is attached to the distal end 90 of the swivel arm 86, such as by bolts and nuts 94, 96. The lower collar 92 includes a threaded passage 98 for receiving an adjustment screw 100 threadably engaged in the passage 98, and extending above an upper surface of the swivel arm 86 for supporting the lower guide pin 50.

The lower guide pin 50 includes a hollow tubular portion 102 at a lower end thereof for receiving the end of the adjustment screw 100, and a set screw 104 may be provided for preventing movement of the lower guide pin 50 relative to the adjustment screw 100. Rotational movement of the adjustment screw 100 within the threaded passage 98 of the lower collar 92 causes a vertical adjustment of the lower guide pin 50 relative to the swivel arm 86 and relative to the upper support pin 66. Additionally, a nut support plate 106 is located affixed to and extending radially from the lower guide pin 50 for engaging a lower surface 108 (FIG. 3) of the lower nut 32 and supporting the lower nut 32 as it is disengaged from (or engaged with) the threads of the threaded shaft 28, as is described further below.

It should be understood that both the lower guide pin 50 and the upper support pin 66 may be replaced with pins 50, 66 having a different diameter. Specifically, depending on the diameter of the bolt assembly 20, and in particular the diameter of the access openings 52, the diameter for the pins 50, 66 may be selected to correspond closely to the diameter of the access openings 52 for facilitating stable support of the nut support tool 10 to the upper nut 34 and support of the lower nut 32 on the nut support tool 10.

Referring to FIG. 6, the swivel arm assembly 46 may include a spring pin 110 that is biased into an opening 112 in the side of the swivel tube 84. The spring pin 110 is provided to engage in a position lock hole 114 (FIG. 5) at the lower end 74 of the inner tube 70 to prevent swiveling movement of the swivel arm assembly 46, and lock it in a predetermined position. In particular, as seen in FIG. 2, the engagement of the spring pin 110 into the position lock hole 114 is configured to lock the swivel arm assembly 46 in position with the axis of the lower guide pin 50 aligned with the axis of the upper support pin 66, such as may be desired for supporting the lower nut 32 relative to the threaded shaft 28 during a nut removal or assembly process. A protective collar 116 may be affixed to the swivel tube 84 surrounding the spring pin 110 to protect the spring pin 110 from inadvertent contact, such as may cause the spring pin 110 to inadvertently disengage or may damage the spring pin 110.

Figure 7:
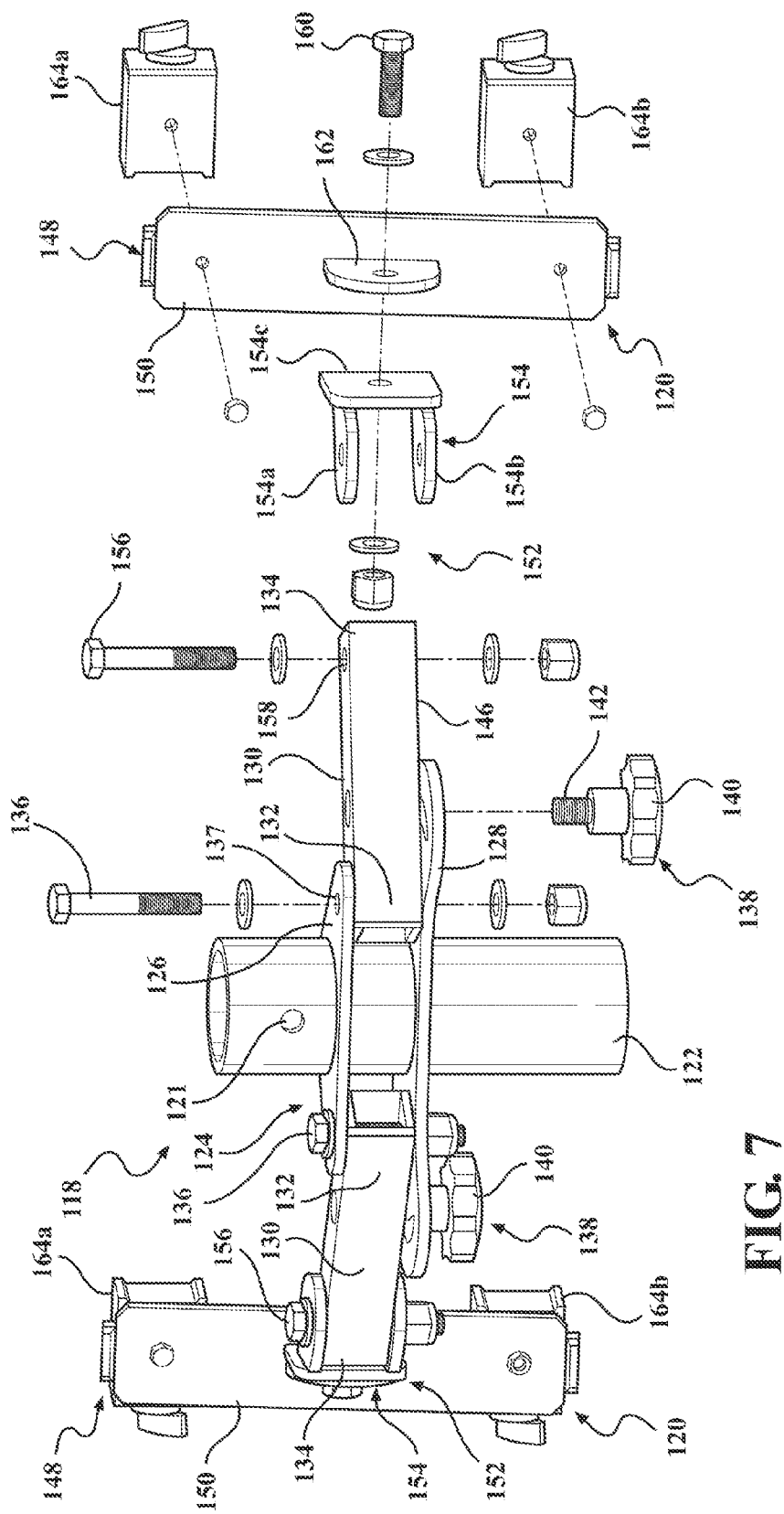
FIG. 7 is a partially exploded view of a stabilizer assembly.

Referring to FIGS. 2 and 7, a stabilizer structure or assembly 118 is supported on the vertical structure 38, located along the vertical structure 38 between the upper support structure 42 and the swivel arm assembly 46. The stabilizer assembly 118 extends generally perpendicular to the longitudinal span axis 40 and includes an engagement foot assembly 120 for engaging a portion of the casing 12.

The stabilizer assembly 118 includes a stabilizer tube 122 positioned over the inner tube 70 at a location above the swivel arm assembly 46. The vertical position of the stabilizer tube 122 along the inner tube 70 may set or selected by aligning a locating hole 121 (FIG. 7) on the stabilizer tube 122 with one of the adjustment holes 78 on the inner tube 70, and the stabilizer tube 122 may be coupled to the inner tube 70 by a pin 123 extending though the locating hole 121 and the selected one of the adjustment holes 78.

Figure 8:
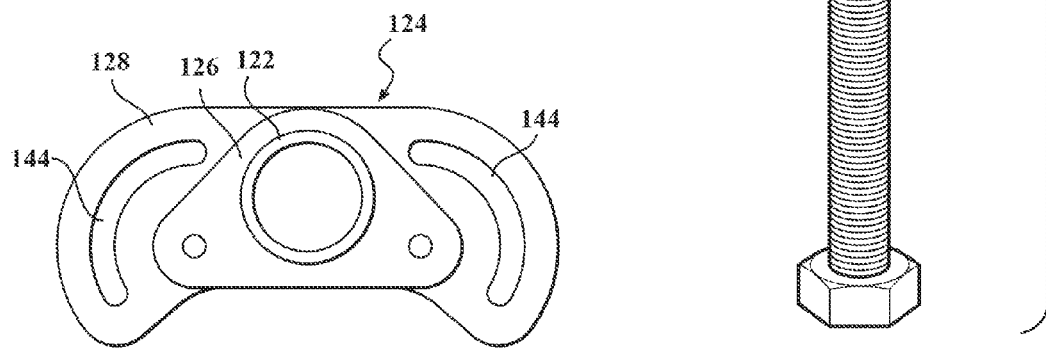
FIG. 8 is a plan view of a coupler structure for the stabilizer assembly.

As may be further seen in FIG. 8, the stabilizer assembly 118 includes a coupler structure 124. The coupler structure 124 comprises an upper plate 126 and a lower plate 128 affixed to the stabilizer tube 122 and oriented parallel to each other. The upper and lower plates 126, 128 of the coupler structure 124 extend to opposing lateral sides of the stabilizer tube 122.

A stabilizer arm 130 is supported to each of the lateral sides of the coupler structure 124. Each stabilizer arm 130 includes a proximal end 132 located at the coupler structure 124 and an opposing distal end 134. In particular, each stabilizer arm 130 is connected to the coupler structure 124 between the upper and lower plates 126, 128 at a pivot bolt 136 passing through the proximal end 132 to permit a lateral pivoting of the stabilizer arms 130 relative to the vertical structure 38 toward and away from the casing 12. The stabilizer arms 130 are typically positioned in diverging relation to each other. Further, each of the stabilizer arms 130 includes an engagement foot structure 148 attached to the distal end 134 of each stabilizer arm 130 for engagement with laterally spaced locations on the turbine casing 12.

Each of the stabilizer arms 130 additionally includes a locking structure which, in accordance with an exemplary aspect, comprises a locking knob assembly 138 including a manually engageable knob 140 and a locking screw 142. The locking screw 142 extends upwardly through an arcuate slot 144 in the lower plate 128 and threadably engages with a lower portion of the stabilizer arm 130. For example, a lower side 146 of the stabilizer arm 130 may include a threaded hole for receiving the locking screw 142. The arcuate slot 144 has a center of curvature at the pivot bolt 136. The stabilizer arms 130 may be pivoted to a selected position, and locked in place by rotating the knob 140 to thread the locking screw 142 into the arm 130 and move the knob 140 upward into frictional engagement on the arm 130. Hence, rotation of the knob 140 causes tightening engagement of the knob 140 with the lower plate 128, and causes a locking frictional engagement between the stabilizer arm 130 and the lower plate 128 to prevent or resist pivotal movement of the stabilizer arm 130.

The engagement foot assembly 120 comprises an engagement foot structure 148 attached to the distal end 134 of each stabilizer arm 130 for engagement with laterally spaced locations on the turbine casing 12. In the illustrated exemplary embodiment, each engagement foot structure 148 includes a foot bar 150 attached to the distal end 134 by an articulated joint 152. The articulate joint 152 may comprise a U-shaped joint weldment 154 pivotally connected to the stabilizer arm 130 at a first articulation bolt 156 extending vertically through weldment legs 154a, 154b and through a hole 158 in the distal end 134, and a second articulation bolt 160 extending horizontally through a weldment base 154c and through a pivot plate 162 extending from a back side of the foot bar 150. First and second switchable magnets 164a, 164b are supported in vertically spaced relation on a front side of the foot bar 150 for engagement on the casing 12. Thus, positioning of the stabilizer assembly 118 may comprise pivotal movement of the stabilizer arms 130 in horizontal plane about the coupler structure 124, and an articulated pivotal movement of the foot bars 150 in both a horizontal and vertical plane to position both of the switchable magnets 164a, 164b in contact with the casing 12. Once in engagement with the casing, the switchable magnets 164a, 164b may be switched on to retain the magnets 164a, 164b in engagement with the casing 12. The switchable magnets 164a, 164b may comprise, for example, a switchable magnet model MB175 sold by ThorLabs of Newton, N.J.

It should be understood that the engagement foot structures 148 may be configured differently than described herein. For example, the engagement foot structures 148 may include only a single magnet on each engagement foot structure 148. That is, the articulated joints 152 could each support a reduced size foot bar for supporting a single switchable magnet, such as one of the switchable magnets 164a, 164b.

Further, it may be understood that the above-described stabilizer assembly 118 is described for the purposes of presenting an exemplary structure that may be provided for stabilizing the nut support tool 10 relative to the casing 12, and that other structures or variations on the described stabilizer assembly 118 may be provided. For example, the stabilizer assembly 118 may comprise a single arm or a plurality of arms, and the arm or arms may include structure other than the engagement foot structure 148 having the described switchable magnetics 164a, 164b. That is, other engagement foot structure 148 including, but not limited to, clamps, rubber feet or other stabilizing elements or mechanisms may be provided, including, for example, engagement foot structures 148 comprising a combination of two or more different structures for stabilizing engagement with the casing 12 or structure associated with the casing 12.

It may be noted the nut support tool 10 may be formed with a relatively light-weight construction, such as a tool that may be carried and positioned by a workman without assistance of machinery such as a hoist or crane.

In an operation utilizing the nut support tool 10, such as a process of removing the lower nut 32, the nut 32 may initially be loosened to de-tension the bolt assembly 20. It may be noted that in FIG. 1 two alternative positions of the lower nut 32 are illustrated, wherein a tightened or tensioned position is illustrated in dotted lines and a de-tensioned released position of the lower nut 32 is illustrated in solid lines.

The length or span of the nut support tool 10 is adjusted at the connection between the outer and inner tubes 56, 70 to provide sufficient space for the swivel arm assembly 46 to pivot laterally away from the threaded shaft 28 while supporting the lower nut 32 and with the upper support structure 42 supported on the upper nut 34. With the length of the nut support tool 10 adjusted, the nut support tool 10 may be positioned on the bolt assembly 20 by a workman positioning the nut support tool 10 such that the upper support pin 66 extends within the access opening in the upper nut 34. During this initial set up procedure, and the subsequent nut lowering procedure, the spring pin 110 is engaged with the position lock hole 114 on the inner tube 70 to maintain the vertical alignment of the lower guide pin 50 with the upper support pin 66.

The stabilizer assembly 118 may then be adjusted to a vertical height that permits the switchable magnets 164a, 164b to fully engage the casing 12, such as to engage the flange 14 of the casing 12. The position of the swing arms 130 is adjusted to position the engagement foot assemblies 148 in engagement with the casing 12 and the switchable magnets 164a, 164b are switched on. The swing arm position is then locked in place by tightening the knobs 140 of the locking structure 138.

With the nut support tool 10 aligned relative to the bolt assembly 20, and the nut support tool 10 locked to the casing 12, the lower guide pin 50 is raised by tuning the screw 100 to engage within the access opening 52 of the lower nut 32. The lower nut 32 is unthreaded from the threaded shaft 28 of the bolt assembly 20 while the screw 100 is backed away from the bolt assembly 20. The support plate 106 need not be in engagement with the lower surface 108 of the lower nut 32 during the unthreading of the lower nut 32 from the threaded shaft 28. However, as the lower nut 32 reaches the end of the threaded shaft 28, the support plate 106 should be engaged or in close proximity to the lower surface 108 of the lower nut 32 to receive and support the lower nut 32.

The screw 100 is rotated to provide a vertical clearance between the lower nut 32 and the threaded shaft 28. The spring pin 110 is then disengaged from the position lock hole 114 of the inner tube 70, permitting the swivel arm assembly 46 to swivel laterally out and away from the casing 12, where the lower nut 32 may be directly accessed by a worker. For example, the swivel arm assembly 46 may be pivoted about 90 degrees or more away from the casing 12. Depending on the size and weight of the lower nut 32, either a worker or a hoist/crane may conveniently lift the lower nut 32 and transfer it to a storage location until it is reassembled to the bolt assembly 20.

Assembly of the lower nut 32 to the threaded shaft 28 may be performed in substantially the reverse order of assembly. In particular, the screw 100 may be used to lift the nut 32 to a location where threads of the lower nut 32 are positioned for initial engagement with the threads of the threaded shaft 28.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A nut support tool for use in combination with a vertically extending bolt assembly for assembly and disassembly of a nut on the vertically extending bolt assembly located on a casing, the bolt assembly including a bolt assembly upper end on an upper end of a threaded shaft and a lower nut engaged on a lower end of the threaded shaft, and the lower nut including an access opening, the nut support tool comprising:
   a vertical span assembly including a vertical structure defining a longitudinal span axis for extending generally parallel to the threaded shaft of a bolt assembly, and an upper support structure extending from an upper end of the vertical structure generally perpendicular to the longitudinal span axis and including an upper support member for engagement on the bolt assembly upper end whereby the nut support tool can be supported from the bolt assembly upper end;
   an arm assembly extending from a lower end of the vertical structure and including a lower guide pin extending generally parallel to the longitudinal span axis for engagement with the access opening of a lower nut; and
   a stabilizer structure supported on the vertical structure between the upper and lower ends of the vertical structure and comprising at least one stabilizer arm including an engagement foot structure, the stabilizer structure extending from the vertical structure in a direction generally toward the bolt assembly located on the casing, wherein the engagement foot structure is located at a distal end of the stabilizer arm and includes a front side facing away from the vertical structure for engagement with the casing.

2. The nut support tool of claim 1, wherein the lower guide pin is movable relative to the upper support member to move the lower guide pin vertically away from the upper support member.

3. The nut support tool of claim 2, including a lower nut support surface associated with the lower guide pin for engaging a lower surface of the lower nut and for supporting the lower nut as the lower nut is disengaged from threads of the threaded shaft.

4. The nut support tool of claim 1, wherein the arm assembly is movable in a lateral direction transverse to the longitudinal span axis to move the lower guide pin away from the threaded shaft of a bolt assembly located on the casing.

5. The nut support tool of claim 1, wherein the vertical structure comprises a telescoping structure for varying the length of the vertical span assembly along the longitudinal span axis.

6. The nut support tool of claim 5, wherein the telescoping structure comprises an upper outer tube and a lower inner tube, the inner tube including a plurality of longitudinally spaced holes, and a pin extending through a hole in the outer tube and through one of the holes in the inner tube to selectively adjust the length of the vertical span assembly.

7. The nut support tool of claim 1, wherein the stabilizer structure comprises a pair of stabilizer arms extending in diverging relation from each other wherein each of the stabilizer arms includes an engagement foot structure for engagement with the casing.

8. The nut support tool of claim 7, wherein each of the engagement foot structures comprises a magnet for attachment to the casing.

9. The nut support tool of claim 1, wherein the stabilizer structure comprises a pair of stabilizer arms spaced laterally for engagement with the casing.

10. A nut support tool configured for use in combination with a vertically extending bolt assembly on a casing and located for assembly and disassembly of a nut on the bolt assembly, the bolt assembly including an upper nut engaged on an upper end of a threaded shaft and a lower nut engaged on a lower end of the threaded shaft, and each of the upper and lower nuts having an access opening, the nut support tool comprising:
   a vertical span assembly including a vertical structure defining a longitudinal span axis for extending generally parallel to the threaded shaft of a bolt assembly located on the casing, the vertical span assembly including telescoping outer and inner tubes;
   the vertical span assembly additionally including an upper support structure extending from an upper end of the vertical structure generally perpendicular to the longitudinal span axis and including an upper support pin extending generally parallel to the longitudinal span axis for engagement in the access opening in an upper nut whereby the nut support tool can be supported from the upper nut;
   an arm assembly extending from a lower end of the vertical structure generally perpendicular to the longitudinal span axis and including a support for engagement with the lower nut; and
   a stabilizer assembly located along the vertical structure between the upper support structure and the arm assembly, the stabilizer assembly extending generally perpendicular to the longitudinal span axis and including a stabilizer tube positioned over the inner tube to selectively adjust the position of the stabilizer assembly along the vertical span assembly and an engagement foot assembly for engaging a portion of a casing that supports the bolt assembly.

11. The nut support tool of claim 10, wherein the inner tube includes a plurality of vertically spaced holes and a pin extends through a hole in the outer tube and through one of the holes in the inner tube to selectively adjust the length of the vertical span assembly.

12. The nut support tool of claim 11, wherein a pin extends through a hole in the stabilizer tube and through one of the holes in the inner tube to selectively adjust the position of the stabilizer assembly along the vertical span assembly.

13. The nut support tool of claim 10, wherein the stabilizer assembly includes a pair of stabilizer arms, each of the stabilizer arms having a proximal end pivotally supported on the stabilizer assembly to enable the engagement foot structures to move relative to the vertical span assembly, the stabilizer assembly including a locking structure associated with each of the stabilizer arms for locking each stabilizer arm at a selected pivoted position.

14. The nut support tool of claim 10, wherein the support on the arm assembly is supported on a screw having threads threadably engaged with the arm assembly, and the screw is rotatable to move a lower guide pin in a vertical direction relative to the upper support pin.

15. The nut support tool of claim 14, wherein the support includes the lower guide pin for engaging in the access opening of the lower nut and includes a nut support plate located affixed to the lower guide pin for engaging a lower surface of the lower nut and for supporting a lower nut as the lower nut is disengaged from threads of the threaded shaft.

16. The nut support tool of claim 10, wherein the upper support pin and a lower guide pin each define a pin diameter and are detachable from the upper support structure and the arm assembly, respectively, and are attached with a detachable retention structure facilitating replacement of the upper support pin and the lower guide pin with respective pins having a different diameter.

17. A nut support tool for use in combination with a vertically extending bolt assembly for assembly and disassembly of a nut on the vertically extending bolt assembly for a horizontal turbine flange joint of a turbine casing, the bolt assembly including an upper nut engaged on an upper end of a threaded shaft above the flange joint and a lower nut engaged on a lower end of the threaded shaft below the flange joint, and each of the upper and lower nuts having an access opening, the nut support tool comprising:
   a vertical span assembly comprising:
      an outer tube weldment including an elongated outer tube having an upper end and a lower end, an upper support structure extending from the upper end of the outer tube perpendicular to a longitudinal span axis of the vertical span assembly;
      an upper support pin extending through the upper support structure and extending beyond a lower side of the upper support structure for engagement with the access opening in an upper nut; and
      an inner tube weldment including an elongated inner tube having an upper end and a lower end, the upper end of the inner tube extending into and being adjustable along the outer tube, and including a lower flange extending radially outwardly at the lower end of the inner tube;
   a swivel arm assembly comprising:
      a swivel tube surrounding the lower end of the inner tube and resting on the lower flange;
      a swivel arm including a proximal end attached to the swivel tube and including a distal end spaced from the swivel tube in a direction perpendicular to the longitudinal span axis; and
      a lower guide pin extending through the distal end of the swivel arm and extending beyond an upper side of the swivel arm for engagement with the access opening of a lower nut;
   a stabilizer assembly comprising:
      a stabilizer tube positioned over the inner tube at a location above the swivel arm assembly;
      a coupler structure affixed to the stabilizer tube, the coupler structure extending to opposing lateral sides of the stabilizer tube;
      a stabilizer arm supported to each of the lateral sides of the coupler structure, each of the stabilizer arms including a proximal end located at the coupler structure and an opposing distal end; and
      an engagement foot structure attached to the distal end of each of the stabilizer arms for engagement with laterally spaced locations on the turbine casing.

18. The nut support tool of claim 17, wherein the lower guide pin is supported on the end of a screw threadably engaged with the distal end of the swivel arm for movement along a direction parallel to the longitudinal span axis.

19. The nut support tool of claim 18, including a nut support plate located affixed to the lower guide pin for engaging a lower surface of a lower nut and for supporting the lower nut as it is disengaged from threads of the threaded shaft.

20. The nut support tool of claim 17, wherein the proximal ends of the stabilizer arms are pivotally mounted to the coupler structure to enable the engagement foot structures to move relative to the vertical span assembly toward and away from the turbine casing, the stabilizer assembly including a locking structure associated with each of the stabilizer arms for locking each of the stabilizer arms to the coupler structure at a selected pivoted position.

\* \* \* \* \*